(12) United States Patent
Ozawa

(10) Patent No.: US 10,747,809 B2
(45) Date of Patent: Aug. 18, 2020

(54) COLOR INFORMATION DISPLAY DEVICE

(71) Applicant: FUJI XEROX CO., LTD., Tokyo (JP)

(72) Inventor: Kazushi Ozawa, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 229 days.

(21) Appl. No.: 15/692,753

(22) Filed: Aug. 31, 2017

(65) Prior Publication Data

US 2018/0260394 A1 Sep. 13, 2018

(30) Foreign Application Priority Data

Mar. 7, 2017 (JP) ................................ 2017-043032

(51) Int. Cl.
| | | |
|---|---|---|
| G06K 9/46 | (2006.01) | |
| G06F 16/583 | (2019.01) | |
| G06T 7/90 | (2017.01) | |
| G06F 16/332 | (2019.01) | |
| G06K 9/62 | (2006.01) | |
| G06T 11/00 | (2006.01) | |
| H04N 1/60 | (2006.01) | |
| G09G 5/02 | (2006.01) | |
| H04N 1/62 | (2006.01) | |
| H04N 1/46 | (2006.01) | |

(52) U.S. Cl.
CPC ...... *G06F 16/5838* (2019.01); *G06F 16/3328* (2019.01); *G06K 9/4652* (2013.01); *G06K 9/6201* (2013.01); *G06T 7/90* (2017.01); *G06T 11/001* (2013.01); *G09G 5/026* (2013.01); *H04N 1/46* (2013.01); *H04N 1/60* (2013.01); *H04N 1/622* (2013.01); *G09G 2320/0666* (2013.01); *G09G 2320/0693* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 5,710,644 A | * | 1/1998 | Ohta | .................... H04N 1/6019 358/504 |
| 2008/0316553 A1 | * | 12/2008 | Tanaka | .................. G06T 11/001 358/518 |
| 2010/0033679 A1 | * | 2/2010 | Kodama | ................ G09B 21/00 351/242 |
| 2014/0198234 A1 | * | 7/2014 | Kobayashi | ........... H04N 1/2129 348/231.99 |

(Continued)

FOREIGN PATENT DOCUMENTS

| | | |
|---|---|---|
| JP | 2006-350066 A | 12/2006 |
| JP | 2010-050830 A | 3/2010 |
| JP | 5286472 B2 | 9/2013 |

*Primary Examiner* — Iman K Kholdebarin
(74) *Attorney, Agent, or Firm* — Oliff PLC

(57) ABSTRACT

A color information display device includes an extracting unit that extracts a reference color combination corresponding to reference color vision characteristics; an output unit that outputs the reference color combination as it is or after conversion in accordance with a degree of sharing of an impression of the reference color combination between the reference color vision characteristics and other color vision characteristics; and an assigning unit that assigns information indicative of the degree of sharing of the impression to the output reference color combination.

9 Claims, 12 Drawing Sheets

(56) References Cited

U.S. PATENT DOCUMENTS

2014/0375671 A1* 12/2014 Giger .................... G06T 7/0012
  345/589
2015/0379732 A1* 12/2015 Sayre, III ............. G06K 9/4652
  382/164

* cited by examiner

COLOR INFORMATION DISPLAY DEVICE

CROSS-REFERENCE TO RELATED APPLICATIONS

This application is based on and claims priority under 35 USC 119 from Japanese Patent Application No. 2017-043032 led Mar. 7, 2017.

BACKGROUND

Technical Field

The present invention relates to a color information display device.

SUMMARY

According to an aspect of the invention, there is provided a color information display device that includes an extracting unit that extracts a reference color combination corresponding to reference color vision characteristics; an output unit that outputs the reference color combination as it is or after conversion in accordance with a degree of sharing of an impression of the reference color combination between the reference color vision characteristics and other color vision characteristics; and an assigning unit that assigns information indicative of the degree of sharing of the impression to the output reference color combination.

BRIEF DESCRIPTION OF THE DRAWINGS

Exemplary embodiments of the present invention will be described in detail based on the following figures, wherein.

Figure 5:
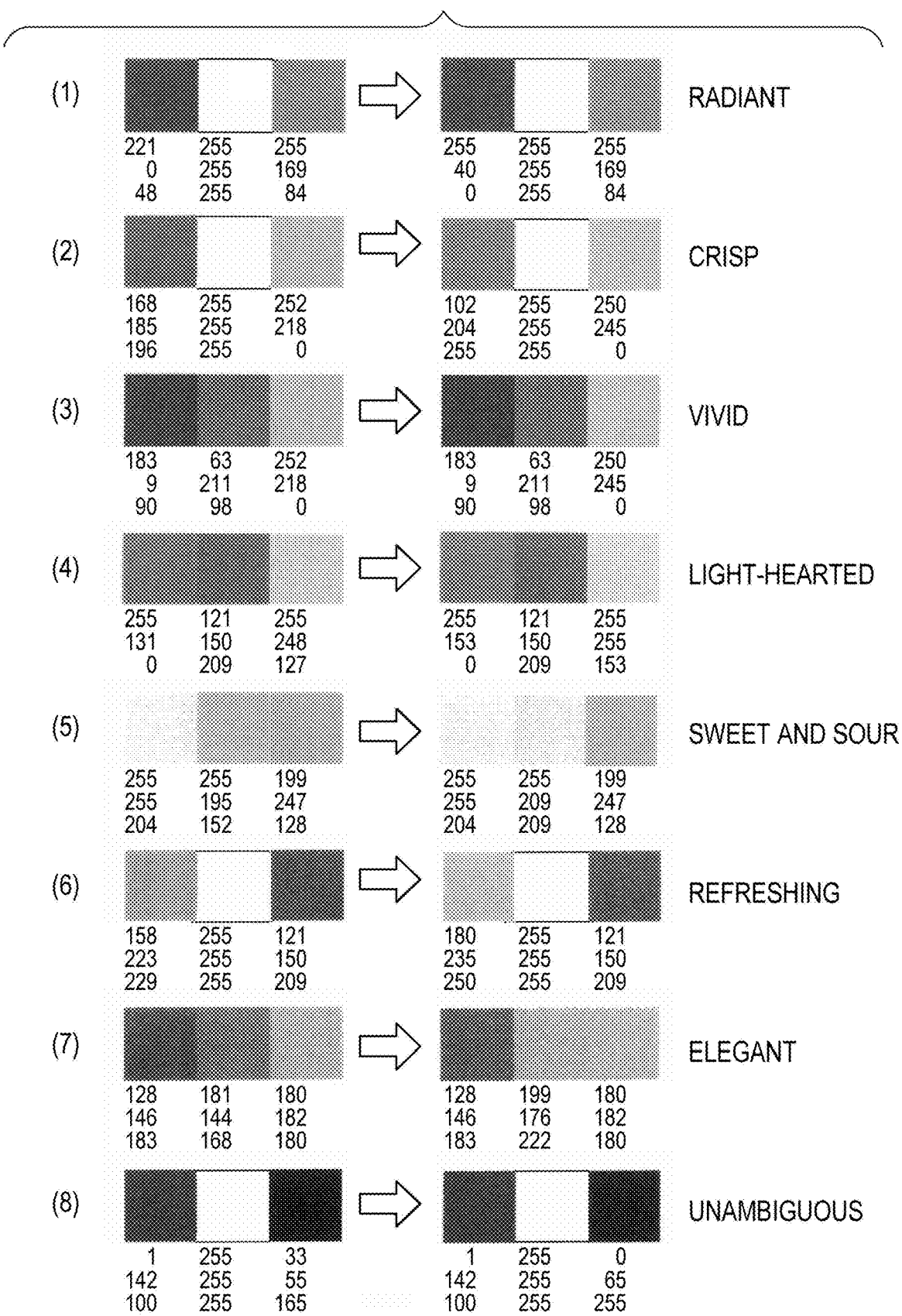
Figure 6:
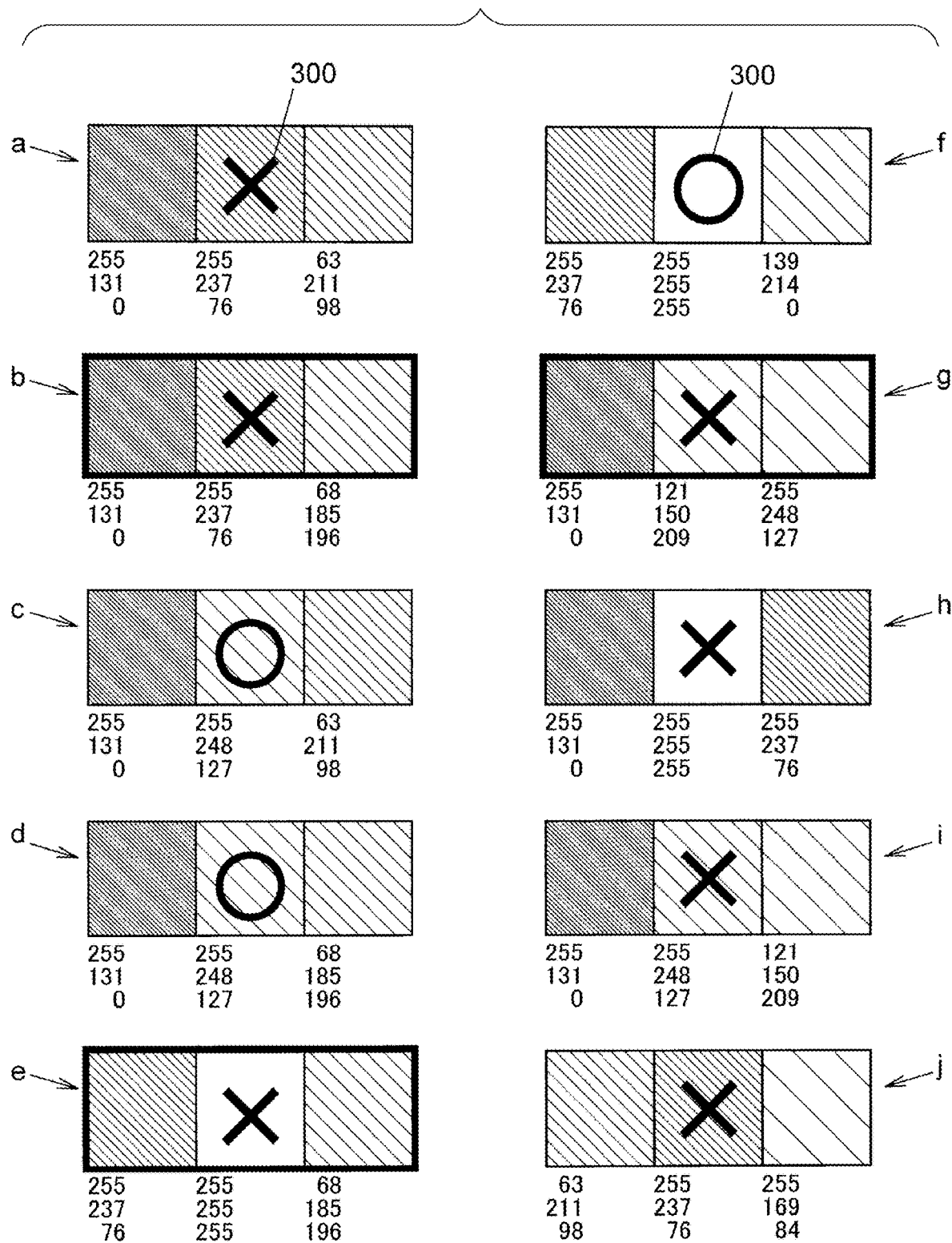
Figure 7:
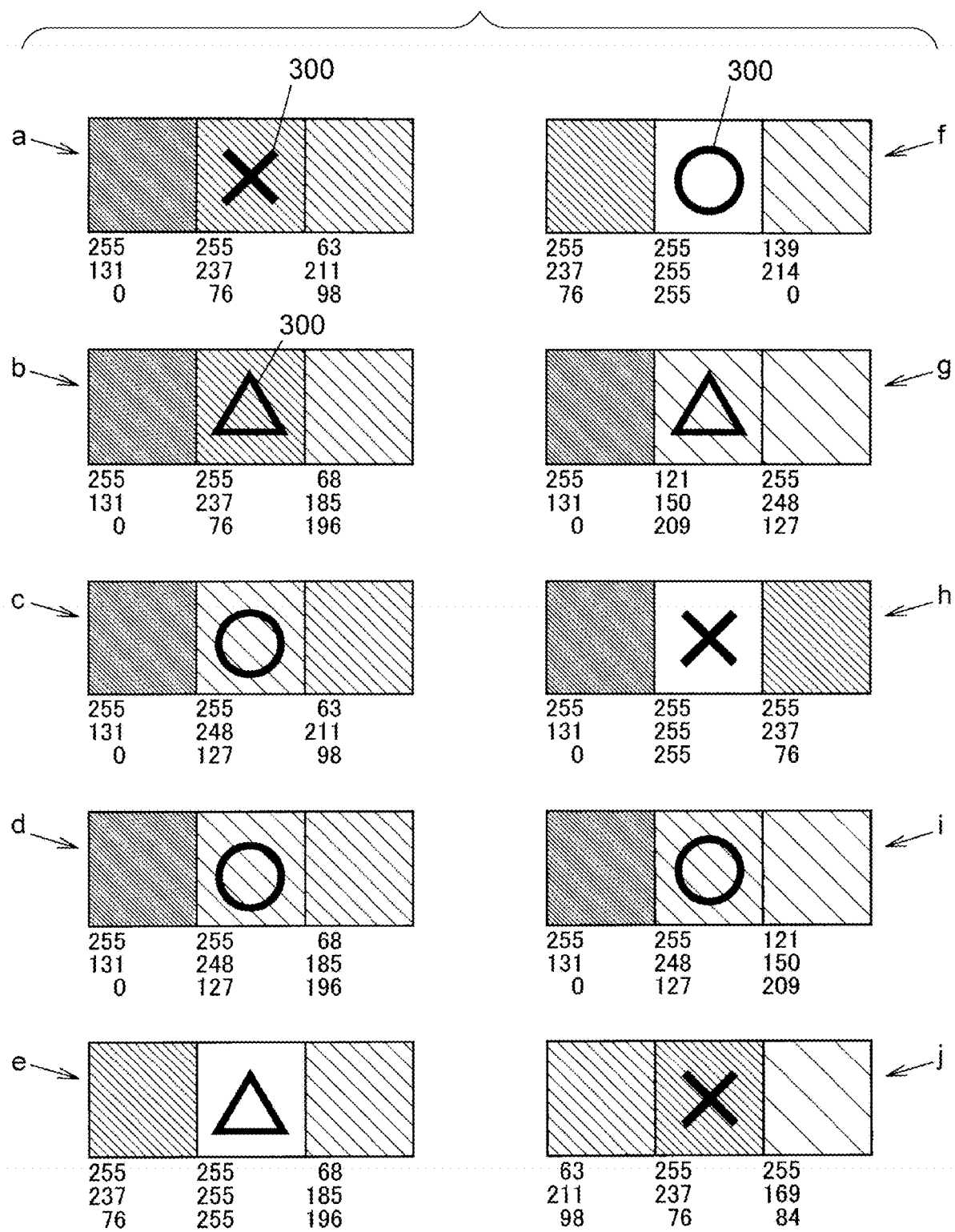
Figure 8:
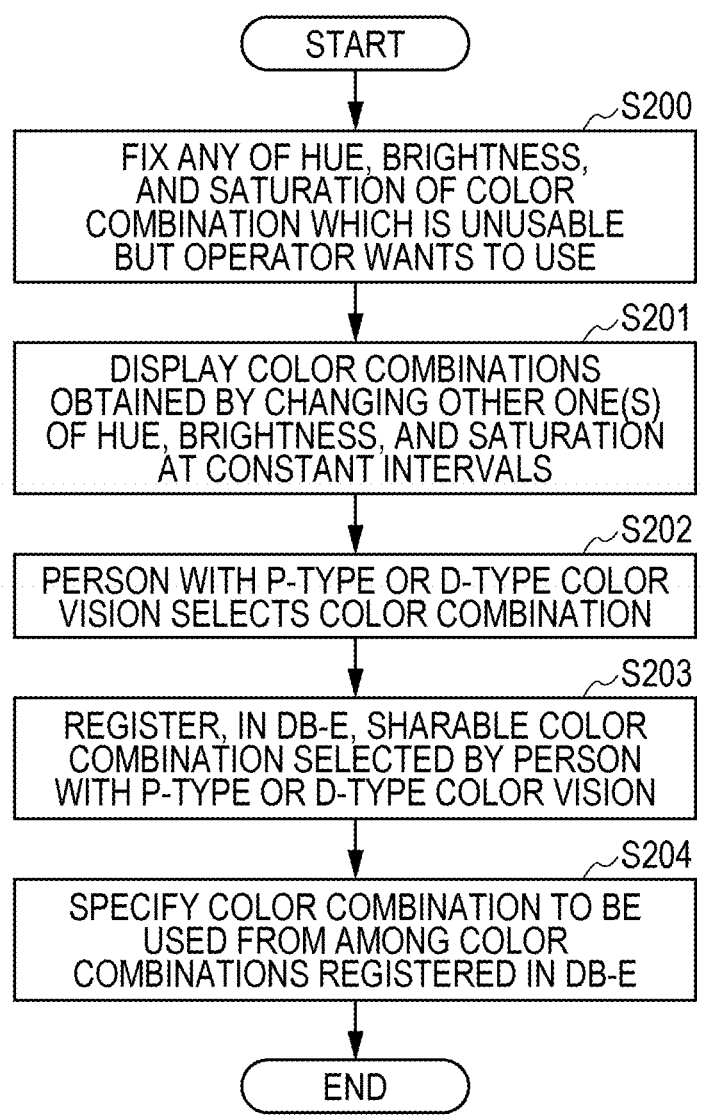
Figure 9:
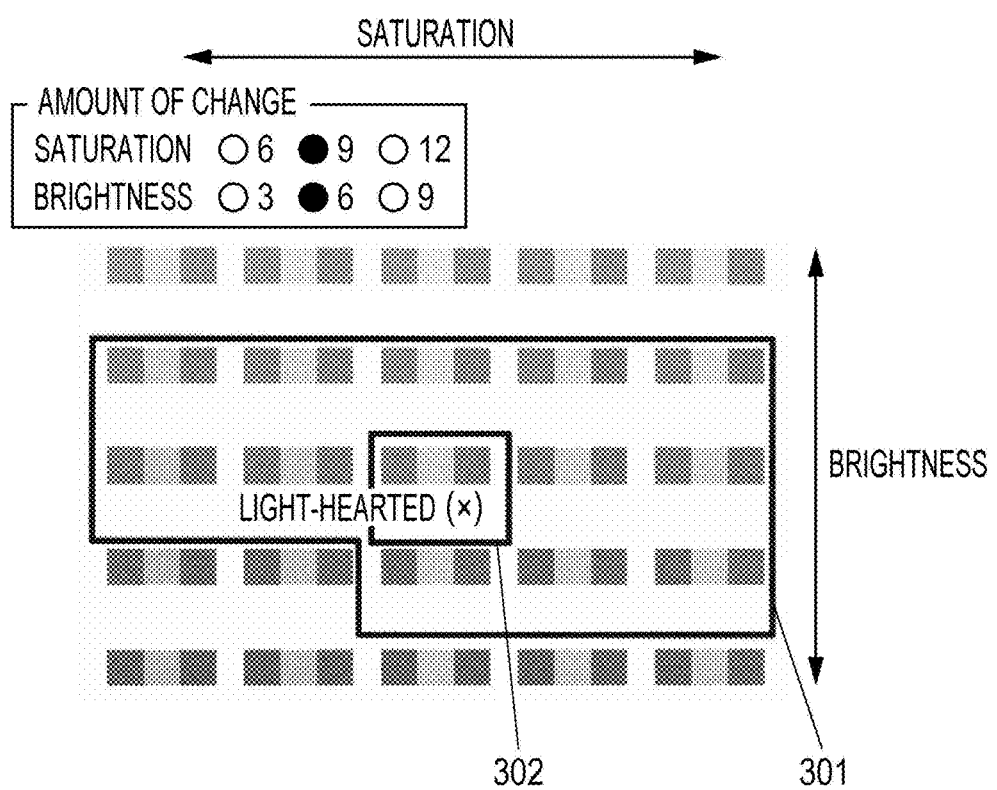
Figure 10:
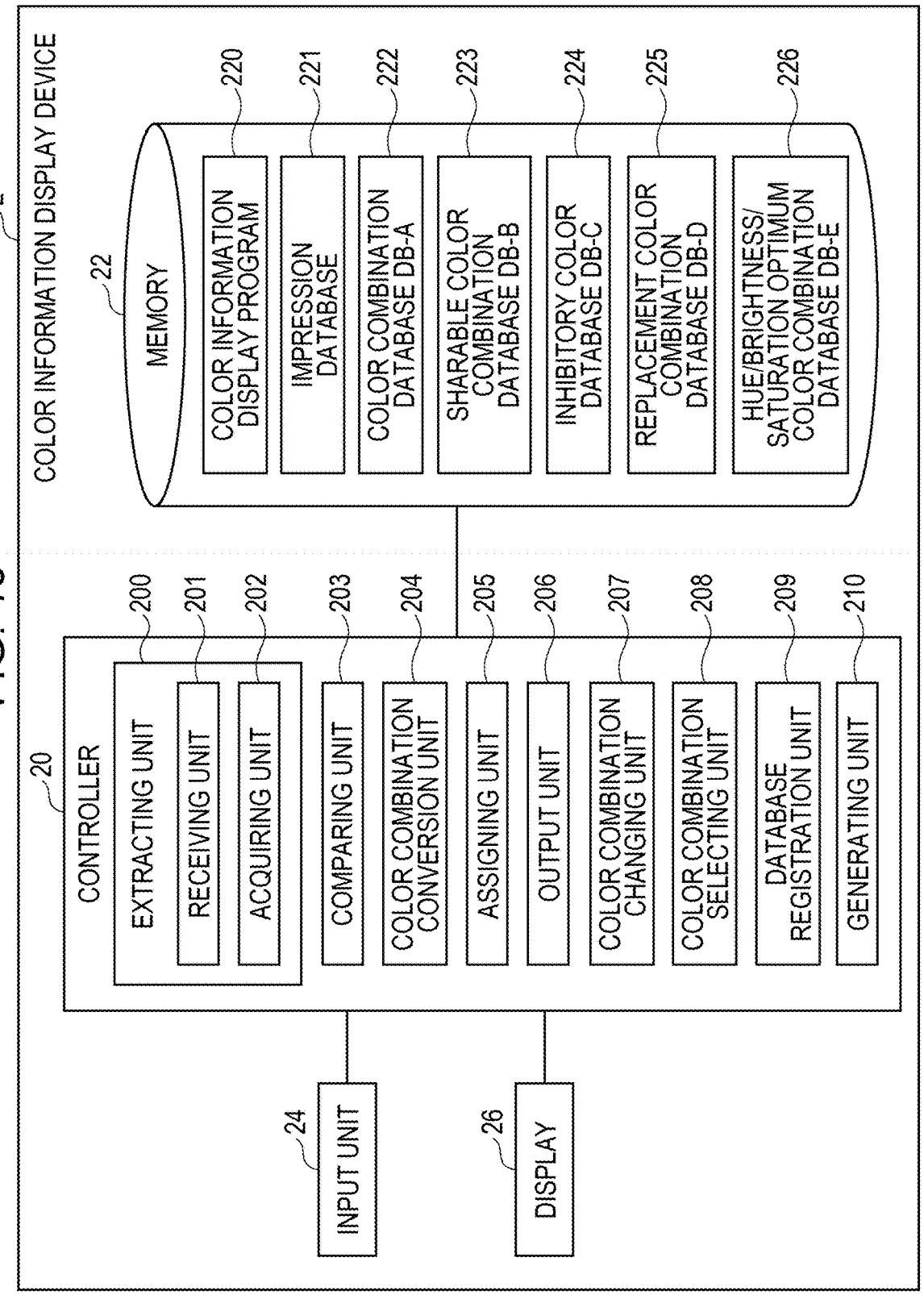
Figure 11:
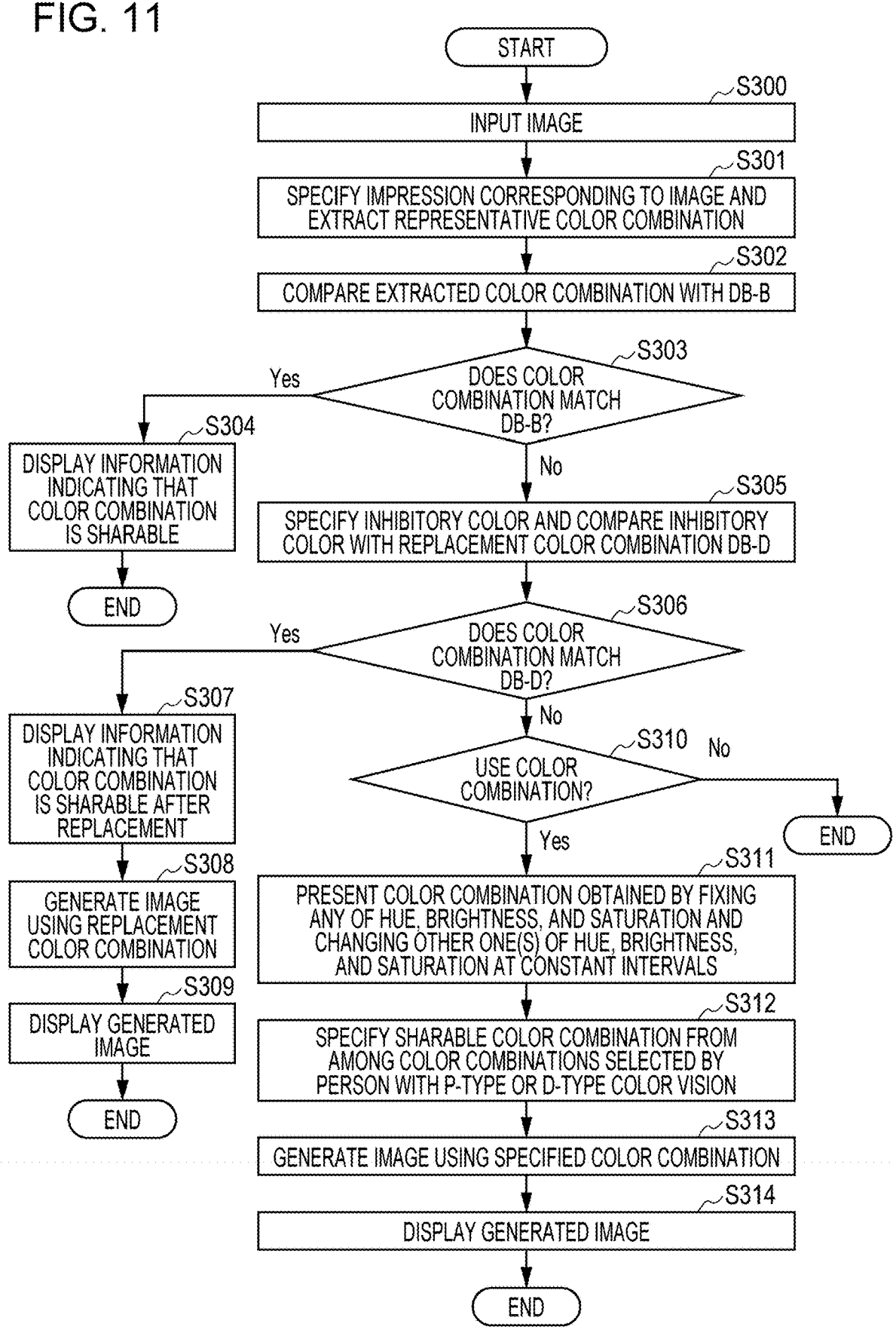
Figure 12:
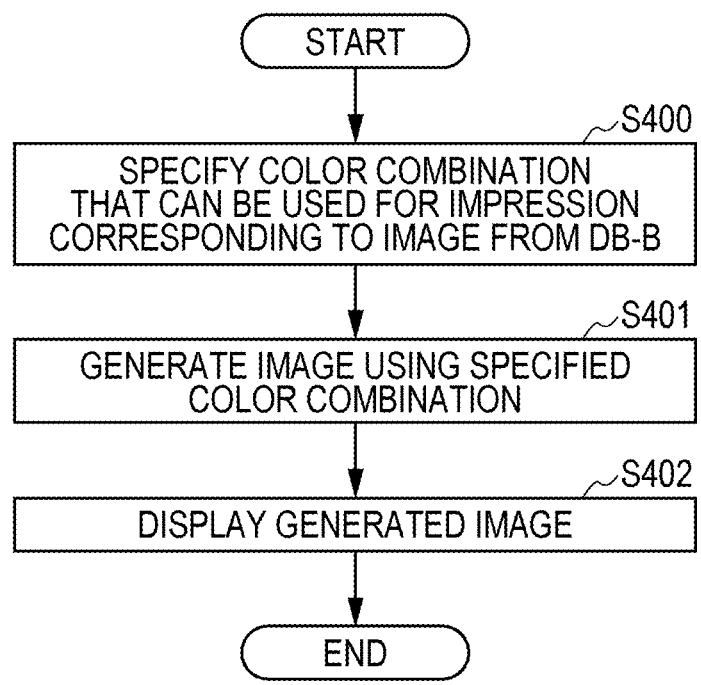

(1) through (8) of FIG. 5 are explanatory views illustrating an example of replacement color combination data;

FIG. 6 is an explanatory view illustrating color combinations for which an impression is made sharable after replacement;

FIG. 7 is an explanatory view illustrating an example in which reference color combinations are displayed together with a degree of sharing of an impression;

FIG. 8 is a flowchart illustrating an example of processing performed in a case where a color combination having a "low" sharing degree is used;

FIG. 9 is an explanatory view illustrating how color combinations obtained by fixing hue of a color combination and changing brightness and saturation of the color combination at constant intervals are displayed;

FIG. 10 is a configuration diagram illustrating an outline of a color information display device according to the second exemplary embodiment of the present invention;

FIG. 11 is a flowchart illustrating an example of operation of the color information display device according to the second exemplary embodiment; and FIG. 12 is a flowchart illustrating an example of operation of a modification of the second exemplary embodiment.

DETAILED DESCRIPTION

Exemplary embodiments of the present invention are described in detail below with reference to the drawings.

Overview of Exemplary Embodiments

A color information display device according to an exemplary embodiment of the present invention includes an extracting unit that extracts a reference color combination corresponding to reference color vision characteristics; an output unit that outputs the reference color combination as it is or after conversion in accordance with a degree of sharing of an impression of the reference color combination between the reference color vision characteristics and other color vision characteristics; and an assigning unit that assigns information indicative of the degree of sharing of the impression to the output color combination.

The reference color vision characteristics are C-type color vision characteristics that are color vision characteristics of a person with general color vision (person with C-type color vision). The other color vision characteristics are color vision characteristics of a person (e.g., a person with P-type or D-type color vision) other than a person with C-type color vision.

The reference color combination is a color combination that causes a person with C-type color vision who sees the color combination to be reminded of a word expressing a specific impression.

The degree of sharing of an impression is a degree to which the impression can be shared by a person with general color vision and a person with P-type or D-type color vision.

The color combination is a combination of plural colors.

First Exemplary Embodiment

In a first exemplary embodiment of the present invention, each color combination that is presented when a word corresponding to an impression is specified is displayed together with a degree of sharing of the impression between a person with general color vision (a person with C-type color vision) and a person with P-type or D-type color vision.

Configuration of Color Information Display Device

Figure 1:
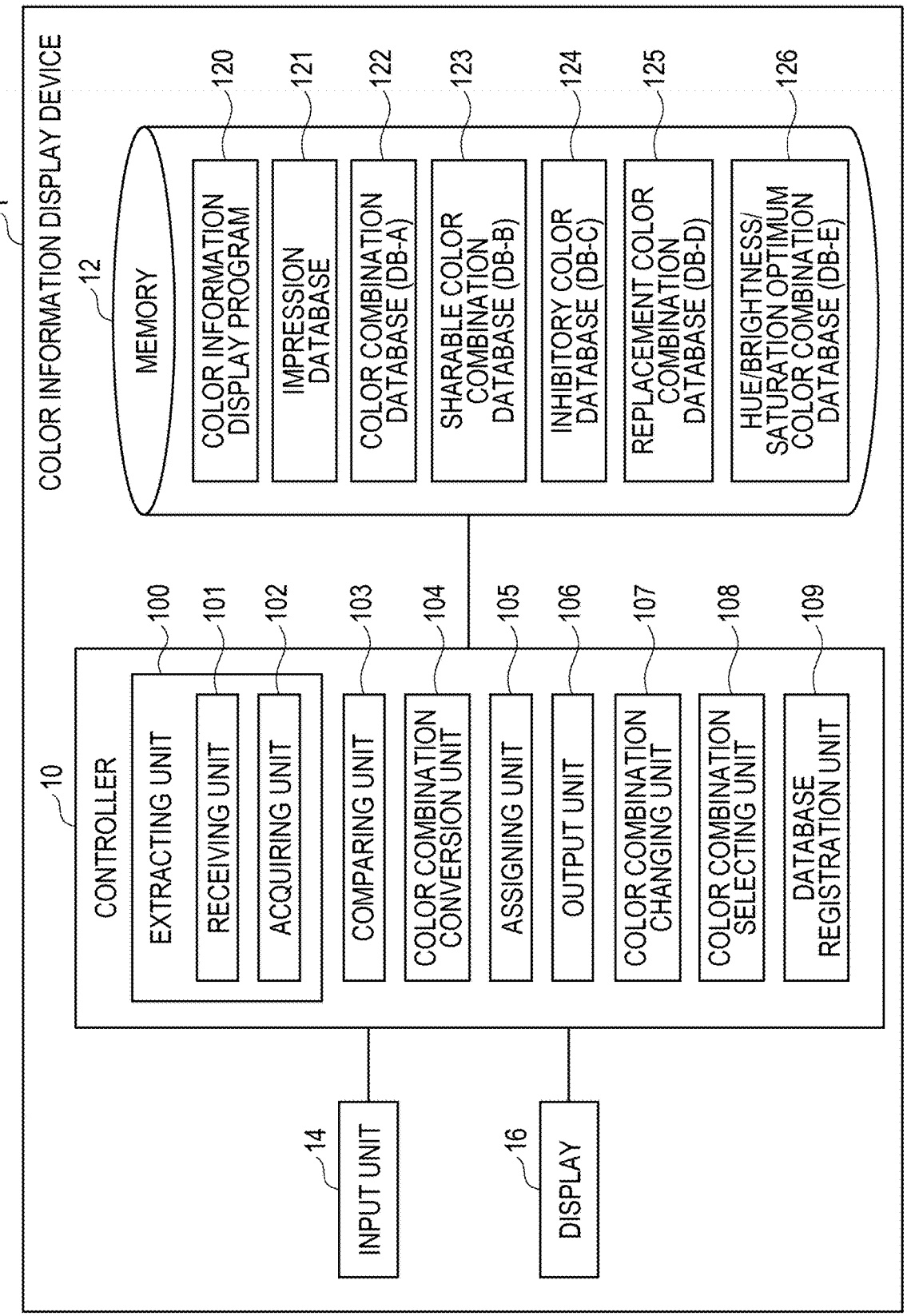
FIG. 1 is a configuration diagram illustrating an outline of a color information display device according to the first exemplary embodiment of the present invention.

FIG. 1 is a configuration diagram illustrating an outline of a color information display device according to the first exemplary embodiment of the present invention.

As illustrated in FIG. 1, a color information display device 1 according to the present exemplary embodiment includes a controller 10, a memory 12, an input unit 14, a display 16, and the like.

The controller 10 is realized by a CPU and the like. The controller 10 controls each unit and executes various programs.

The controller 10 includes an extracting unit 100, comparing unit 103, a color combination conversion unit 104, an assigning unit 105, an output unit 106, a color combination changing unit 107, a color combination selecting unit 108, and a database registration unit 109. The extracting unit 100 includes a receiving unit 101 and an acquiring unit 102.

The memory 12 is realized by a storage medium such as a hard disc or a flash memory and stores therein information.

The memory 12 includes a color information display program 120, an impression database 121, a color combination database (DB-A) 122, a sharable color combination database (DB-B) 123, an inhibitory color database (DB-C) 124, a replacement color combination database (DB-D) 125, and a hue/brightness/saturation optimum color combination database (DB-E) 126.

The extracting unit 100 extracts a reference color combination corresponding to reference color vision characteristics.

The extracting unit 100 includes the receiving unit 101 and the acquiring unit 102. When the receiving unit 101 receives a word corresponding to an impression, the acquiring unit 102 acquires a color combination corresponding to the word from the color combination database (DB-A) 122. In this way, the extracting unit 100 extracts the reference color combination.

That is, the extracting unit 100 extracts as a reference color combination, a color combination that causes a person with C-type color vision to be reminded of a word representing an impression.

The comparing unit 103 examines whether or not an impression of a color combination to be used can be shared by a person with C-type color vision and a person with P-type or D-type color vision, i.e., examines a degree of sharing of the impression (sharing degree) by comparing the color combination with data in various color combination databases (the sharable color combination database (DB-B) 123, the inhibitory color database (DB-C) 124, and the replacement color combination database (DB-D) 125).

The color combination conversion unit 104 converts a color combination into a replacement color combination in a case where the color combination to be used cannot be used as it is because an impression of the color combination cannot be shared by a person with C-type color vision and a person with P-type or D-type color vision but where it is determined, as a result of comparison with the replacement color combination database (DB-D) 125, that replacement of the color combination makes the impression sharable.

The assigning unit 105 assigns, to a color combination, information obtained as a result of comparison between the color combination and the color combination databases in the comparing unit 103, i.e., information indicative of a degree of sharing of an impression of the color combination between a person with C-type color vision and a person with P-type or D-type color vision.

The output unit 106 supplies, to the display 16, a color combination to be used together with a degree of sharing of an impression assigned to the color combination or a color combination obtained by conversion of the color combination to be used.

The color combination changing unit 107 fixes any of hue, brightness, and saturation of a color combination to be used and changes other one(s) of the hue, brightness, and saturation at constant intervals in a case where even replacement of the color combination does not make the impression sharable and where a color combination close to this color combination is used without changing the impression.

The color combination selecting unit 108 selects a color combination designated as a color combination that gives the same impression as an original impression by a person with P-type or D-type color vision from among color combinations obtained by the color combination changing unit 107.

The database registration unit 109 causes a color combination selected by the color combination selecting unit 108 to be newly registered in the hue/brightness/saturation optimum color combination database (DB-E) 126.

The color information display programs 120 stored in the memory 12 causes the controller 10 to function as each of the aforementioned units. The impression database 121 is a database in which words expressing impressions such as "light-hearted", "lively", and "radiant" are accumulated. In this example, 360 kinds of impressions (words) are registered in the impression database 121.

The color combination database (DB-A) 122 is a database in which color combinations that cause a person with C-type color vision to be reminded of the words registered in the impression database 121 are accumulated as reference color combinations. For each word representing an impression, 10 kinds of color combinations are prepared. That is, 3600 kinds of color combinations in total are registered in the color combination database (DB-A) 122.

The sharable color combination database (DB-B) 123 is a database in which color combinations that cause both a person with C-type color vision and a person with P-type or D-type color vision to be reminded of the same impression, i.e., color combinations that give sharable impressions are accumulated. Among the 3600 kinds of color combinations, 2853 kinds of color combinations that have been found to give sharable impressions as a result of a survey conducted for a person with P-type or D-type color vision are registered in the sharable color combination database (DB-B) 123.

That is, a color combination registered in the sharable color combination database (DB-B) 123 gives the same feeling to both a person with C-type color vision and a person with P-type or D-type color vision and is therefore evaluated as a color combination with a high sharing degree. That is, in a case where a certain impression is expressed, a color combination can be used as it is.

The inhibitory color database (DB-C) 124 is a database in which inhibitory colors that make impressions of color combinations unable to share in a case where the impressions cannot be shared by a person with C-type color vision and a person with P-type or D-type color vision are accumulated. In the inhibitory color database (DB-C) 124, 8 colors are registered, but details thereof will be described later together with the replacement color combination database (DB-D) 125.

The replacement color combination database (DB-D) 125 is a database in which replacement color combinations that replace color combinations for which an inhibitory color has been specified are accumulated. Plural replacement color combinations are prepared for each of the 8 inhibitory colors, and 232 replacement color combinations in total are registered. This will also be described in detail later.

The hue/brightness/saturation optimum color combination database (DB-E) 126 is a database that registers therein color combinations selected by a person with P-type or D-type color vision from among color combinations obtained by fixing any of hue, brightness, and saturation and changing, at constant intervals, other one(s) of the hue, brightness, and saturation of color combinations that give impressions unable to share and to which the inhibitory color database (DB-C) 124 and the replacement color combination database (DB-D) 125 are not applied.

A keyboard, a mouse, a touch panel, or the like can be used as appropriate as the input unit 14. The display 16 displays a character or an image and is realized by a display device or the like.

Operation of First Exemplary Embodiment

Figure 2:
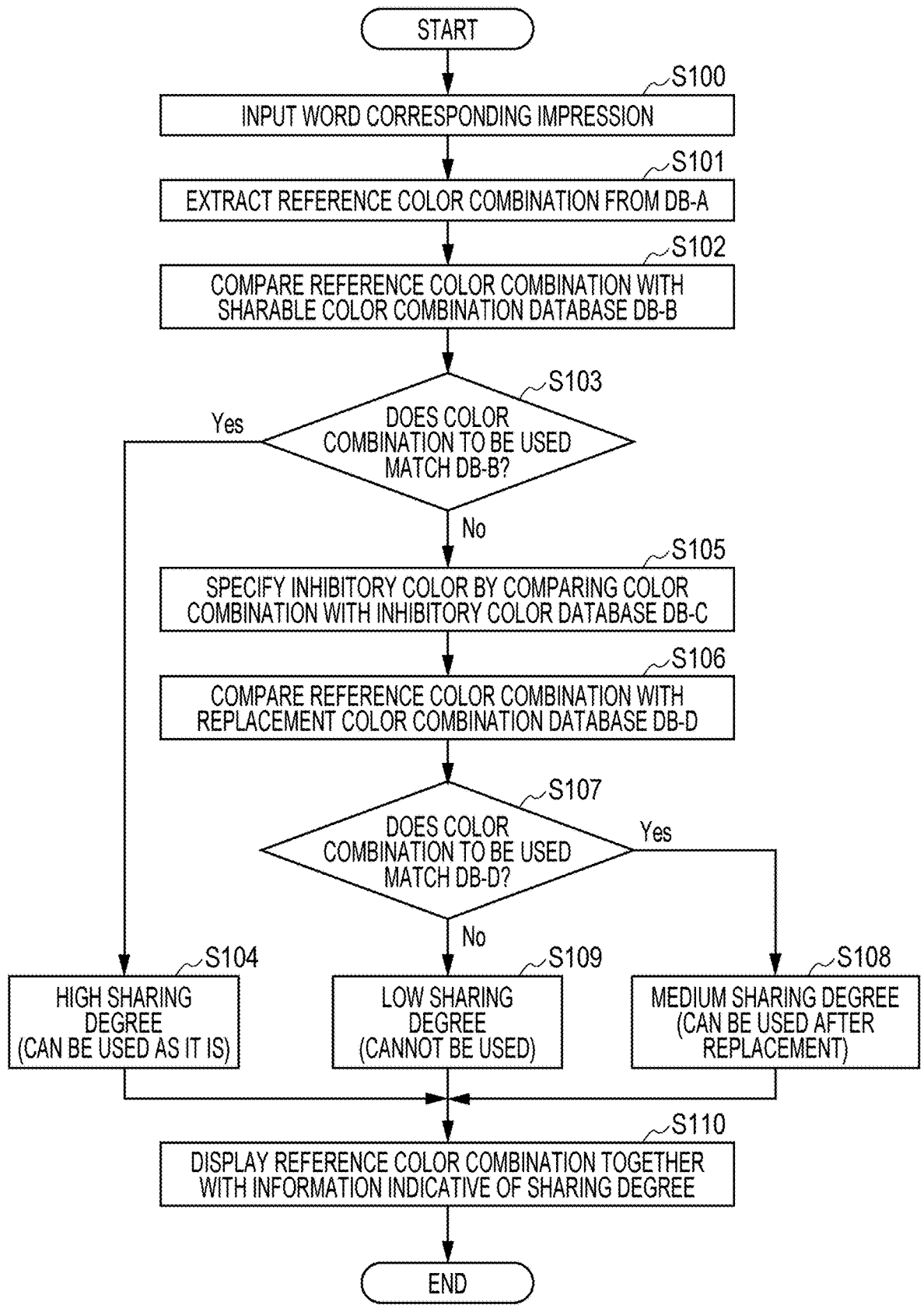
FIG. 2 is a flowchart illustrating an example of operation of the color information display device according to the first exemplary embodiment.

Next, operation of the color information display device 1 according to the first exemplary embodiment of the present invention is described with reference to FIG. 2. FIG. 2 is a flowchart illustrating an example of operation of the color information display device 1 according to the first exemplary embodiment.

Process for Assigning Sharing Degree

A person who operates the color information display device 1 first inputs a word corresponding to an impression by using the input unit 14 (Step S100). It is assumed here that the operator inputs a single word selected from the 360 words registered in the impression database 121.

The operator may directly input this word corresponding to the impression by using the input unit 14 or may cause data registered in the impression database 121 to be displayed on the display 16 and select the word from the displayed data.

The impression word input by using the input unit 14 is received by the receiving unit 101 of the extracting unit 100. The word received by the receiving unit 101 is sent to the acquiring unit 102. The acquiring unit 102 acquires, as reference color combinations, color combinations associated with the word, i.e., color combinations that cause a person with C-type color vision to be reminded of the impression word from the color combination database (DB-A) 122. In this way, the reference color combinations corresponding to the impression word are extracted by the extracting unit 100 (S101).

Figure 3:
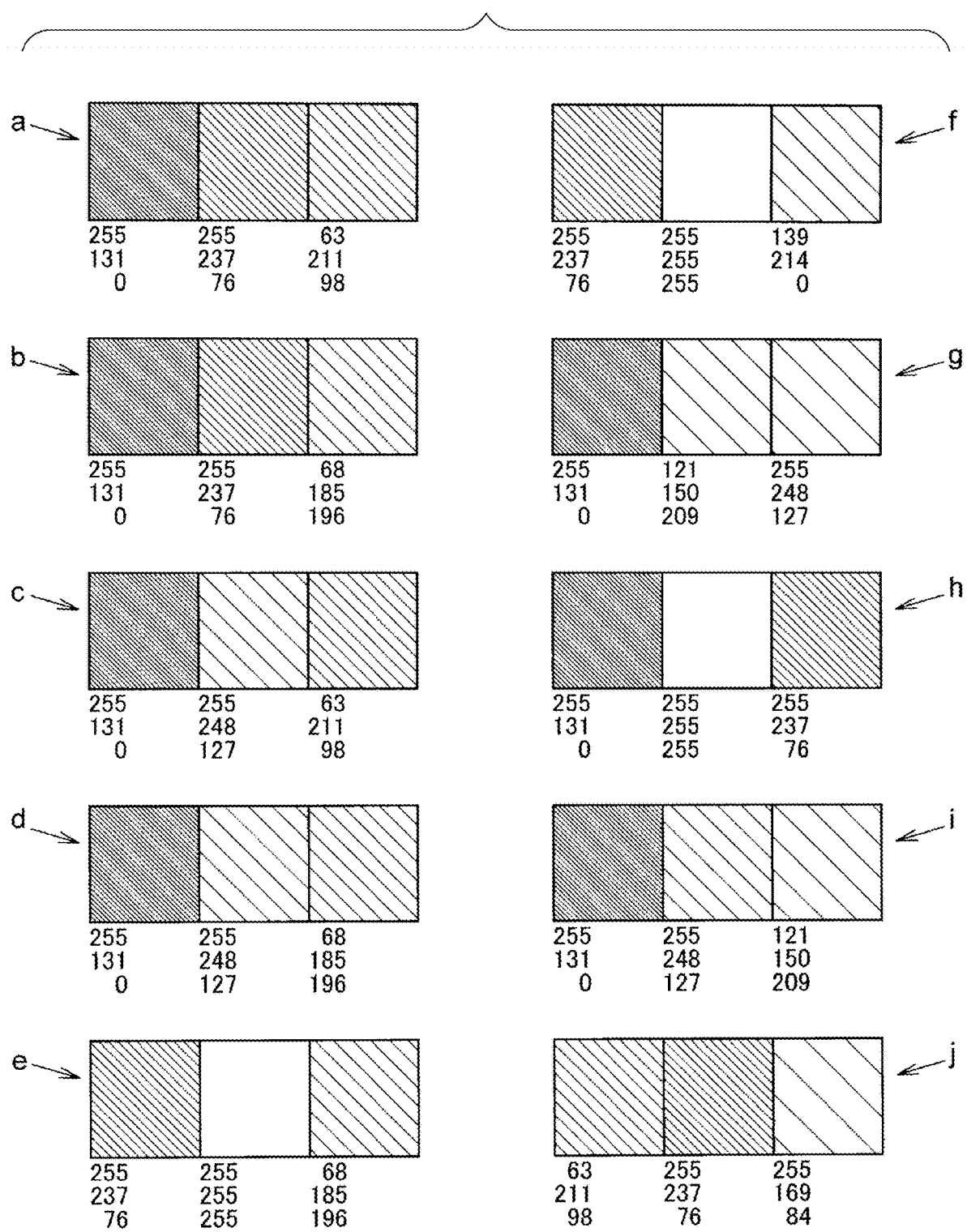
FIG. 3 is an explanatory view illustrating an example of reference color combinations.

FIG. 3 illustrates an example of the reference color combinations. FIG. 3 illustrates 10 color combinations a through j each made up of three colors and each corresponding to the impression word "light-hearted". Three numerical values below each color of each of the color combinations a through j are RGB values for specifying the color. For example, in a case where all of the three RGB values of a color are 255, the color is "white". Three colors are an example of a color combination.

The extracted reference color combinations are sent to the comparing unit 103. Next, the comparing unit 103 compares the reference color combinations with the sharable color combination database (DB-B) 123 (S102). In the sharable color combination database (DB-B) 123, the 2853 color combinations each giving an impression that can be shared by a person with C-type color vision and a person with P-type or D-type color vision are registered.

In a case where it is determined, as a result of the comparison, that a color combination which the operator wants to use among the reference color combinations matches the sharable color combination database (DB-B) 123 (Yes in S103), this color combination can be used as it is because an impression of the color combination can be shared between a person with C-type color vision and a person with P-type or D-type color vision. Therefore, this color combination is determined to have a high sharing degree (S104). The expression "the reference color combination matches the sharable color combination database (DB-B) 123" means that the reference color combination is identical to any of the color combinations accumulated in the sharable color combination database (DB-B) 123.

Figure 4:
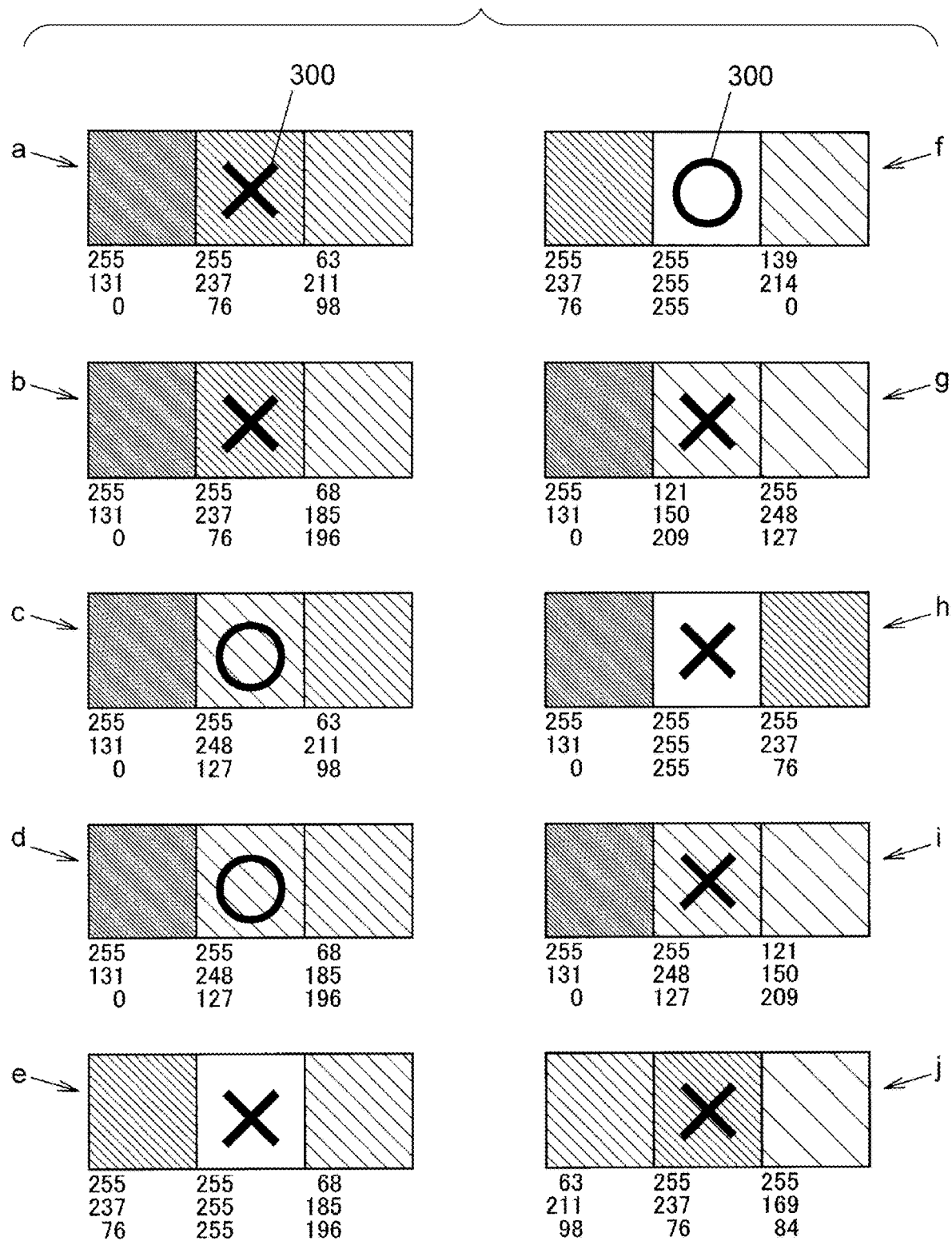
FIG. 4 is an explanatory view illustrating an example of a result of comparison with a sharable color combination database.

FIG. 4 illustrates an example of a result of comparison with the sharable color combination database (DB-B) 123. For example, it is assumed that the color combination c, the color combination d, and the color combination f among the 10 reference color combinations a through j illustrated in FIG. 3 match the sharable color combination database (DB-B) 123. In FIG. 4, these three color combinations c, d, and f are indicated by a circle mark indicating a high sharing degree. For the time being, the other color combinations are given a cross mark indicating that these color combinations do not match the sharable color combination database (DB-B) 123. The circle, triangle, and cross marks are an example of information 300 indicative of a degree of sharing of an impression. The information 300 is not limited to symbols such as the circle, triangle, and cross marks and can be, for example, numerals other than symbols.

In a case where it is determined, as a result of the comparison, that a color combination which the operator wants to use among the reference color combinations does not match the sharable color combination database (DB-B) 123 (No in S103), the comparing unit 103 compares this color combination (i.e., a color combination given a cross mark in FIG. 4) with the inhibitory color database (DB-C) 124 and thus specifies a color that makes the impression unable to share (S105).

Inhibitory Color

The inhibitory colors are, for example, the following 8 colors:
(i) "red" (R;G;B=221;0;48),
(ii) "sky blue" (R;G;B=68;185;196),
(iii) "yellow" (R;G;B=252;218;0),
(iv) "orange" (R;G;B=255;131;0),
(v) "beige" (R;G;B=255;195;152),
(vi) "very light blue" (R;G;B=158;223;229),
(vii) "reddish violet" (R;G;B=181;144;168), and
(viii) "blue" (R;G;B=33;55;165).

After specifying an inhibitory color, the comparing unit 103 compares the reference color combination with the replacement color combination database (DB-D) 125 (S106).

Example of Replacement Color Combination Data (1) through (8) of FIG. 5 are examples of replacement color combination data. (1) through (8) of FIG. 5 are examples of replacement color combination data corresponding to the aforementioned 8 inhibitory colors (i) through (viii), respectively.

For example, (1) of FIG. 5 is an example of a color combination that corresponds to the impression word "radiant" in a case where (i) "red" (R;G;B=221;0;48) is an inhibitory color. Although a person with C-type color vision who sees the color combination on the left side of (1) of FIG. 5 feels "radiant", "red" (R;G;B=221;0;48) looks "crimson" that is a dark red for a person with P-type color vision, and therefore the person with P-type color vision who sees a color combination including "red" (R;G;B=221;0;48) does not feel "radiant".

In view of this, in a case where "red" (R;G;B=221;0;48) is replaced with R;G;B=255;40;0; even a person with P-type color vision perceives bright "red" and can feel an energetic feeling and a feeling of clear contrast to other hues. Accordingly, in the case of the color combination on the right side of (1) of FIG. 5, even a person with P-type color vision can feel "radiant". Furthermore, with this level conversion of the color combination, a person with C-type color vision still feels "radiant". Accordingly, as a result of the replacement, the impression can be shared by a person with C-type color vision and a person with P-type or D-type color vision.

Other examples of an impression word for which a similar improved color combination can be obtained by replacing the inhibitory color "red" of a color combination include "aggressive", "powerful", "flashy", "intense", and "active".

(2) of FIG. 5 is an example of a color combination that corresponds to the impression word "crisp" in a case where (ii) "sky blue" (R;G;B=68;185;196) is an inhibitory color. In a case where the leftmost "sky blue" R;G;B=68;185;196 of the color combination on the left side of (2) of FIG. 5 is replaced with R;G;B=102;204;255 as in the color combination on the right side of (2) of FIG. 5, a person with P-type color vision feels a more fresh impression instead of clouded or darkened sky blue. As a result, this replacement makes the impression "crisp" sharable between a person with C-type color vision and a person with P-type or D-type color vision.

Other examples of an impression for which a similar improved color combination can be obtained by replacing the inhibitory color "sky blue" of a color combination include "summerly", "clear", "fresh", "brand-new", "damp", "new", and "light-hearted".

(3) of FIG. 5 is an example of a color combination that corresponds to the impression word "vivid" in a case where (iii) "yellow" (R;G;B=252;218;0) is an inhibitory color. In a case where the rightmost "yellow" R;G;B=252;218;0 of the color combination on the left side of (3) of FIG. 5 is replaced with R;G;B=250;245;0 as in the color combination on the right side of (3) of FIG. 5, even a person with P-type color vision feels a vivid and light-hearted impression instead of darkened yellow. As a result, this replacement makes the impression "vivid" sharable between a person with C-type color vision and a person with P-type or D-type color vision.

Other examples of an impression for which a similar improved color combination can be obtained by replacing the inhibitory color "yellow" of a color combination include "vigorous", "delightful", "open-minded", "fierce", "bustling", "painful", "animated", and "thrilling".

(4) of FIG. 5 is an example of a color combination that corresponds to the impression word "light-hearted" in a case where (iv) "orange" (R;G;B=255;131;0) is an inhibitory color. In a case where the leftmost "orange" R;G;B=255; 131;0 of the color combination on the left side of (4) of FIG. 5 is replaced with R;G;B=255;153;0 on the right side of (4) of FIG. 5, even a person with P-type color vision feels an impression of purer orange instead of clouded orange. As a result, this replacement makes the impression "light-hearted" sharable between a person with C-type color vision and a person with P-type or D-type color vision.

Other examples of an impression for which a similar improved color combination can be obtained by replacing the inhibitory color "orange" of a color combination include "hot", "bright", "simple", "energetic", "passionate", and "thrilling".

(5) of FIG. 5 is an example of a color combination that corresponds to the impression word "sweet and sour" in a case where (v) "beige" (R;G;E=255;195;152) is an inhibitory color. In a case where the middle "beige" R;G;B=255; 195;152 of the color combination on the left side of (5) of FIG. 5 replaced with R;G;B=255;209;209 on the right side of (5) of FIG. 5, a person with P-type color vision feels a more youthful impression instead of darkened beige. As a result, this replacement makes the impression "sweet and sour" sharable between a person with C-type color vision and a person with P-type or D-type color vision.

Other examples of an impression for which a similar improved color combination can be obtained by replacing the inhibitory color "beige" of a color combination include "lovely", "soft", "balmy", "cute", and "cheerful".

(6) of FIG. 5 is an example of a color combination that corresponds to the impression word "refreshing" in a case where (vi) "very light blue" (R;G;B=158;223;229) is an inhibitory color. In a case where the leftmost "very light blue" R;G;B=158;223;229 of the color combination on the left side of (6) of FIG. 5 is replaced with R;G;B=180;235; 250 on the right side of (6) of FIG. 5, a person with P-type color vision feels a more transparent impression instead of darkened light blue. As a result, this replacement makes the impression "refreshing" sharable between a person with C-type color vision and a person with P-type or D-type color vision.

Other examples of an impression for which a similar improved color combination can be obtained by replacing the inhibitory color "very light blue" of a color combination include "cool", "clear", "brand-new", and "airy".

(7) of FIG. 5 is an example of a color combination that corresponds to the impression word "elegant" in a case where (vii) "reddish violet" (R;G;B=181;144;168) is an inhibitory color. In a case where the middle "reddish violet" R;G;B=181;144;168 of the color combination on the left side of (7) of FIG. 5 is replaced with R;G;B=199;178;222 on the right side of (7) of FIG. 5, a person with P-type color vision feels a soft impression instead of reddish violet that give a sense of hardness. As a result, this replacement makes the impression "elegant" sharable between a person with C-type color vision and a person with type or D-type color vision.

Other examples of an impression for which a similar improved color combination can be obtained by replacing the inhibitory color "reddish violet" of a color combination include "suspicious", "emotional", "graceful", "shiny", "delicate", and "sexy".

(8) of FIG. 5 is an example of a color combination that corresponds to the impression word "unambiguous" in a case where (viii) "blue" (R;G;B=33;55;165) is an inhibitory color. In a case where the rightmost "blue" R;G;B=33;55; 165 of the color combination on the left side of (8) of FIG. 5 is replaced with R;G;B=0;65;255 on the right side of (8) of FIG. 5, a person with P-type color vision feels a sense of bright transparency instead of dark and clouded blue. As a result, this replacement makes the impression "unambiguous" sharable between a person with C-type color vision and a person with P-type or D-type color vision.

Other examples of an impression for which a similar improved color combination can be obtained by replacing the inhibitory color "blue" of a color combination include "vivid", "healthy", and "innovative".

Process for Displaying Color Combination Together with Sharing Degree

See the flowchart of FIG. 2 again. In a case where the comparing unit 103 compares the reference color combination that does not match the sharable color combination database (DB-B) 123 with the replacement color combination database (DB-D) 125 and, as a result, the reference color combination matches the replacement color combination database (Yes in S107), the color combination determined to have a "medium" sharing degree because the impression can be shared after replacement of the color combination (S108).

Among the reference color combinations a through j, color combinations that do not match the sharable color combination database (DB-B) 123 are given a cross mark as illustrated in FIG. 4. For example, the color combination g includes, on the leftmost side thereof, an inhibitory color "orange" R;G;B=255;131;0 but matches the replacement color combination data of (4) of FIG. 5, and therefore the impression can be shared in a case where the color combination is replaced as illustrated in (4) of FIG. 5. Therefore, this color combination g is surrounded by the thick frame as illustrated in FIG. 6.

Furthermore, it is assumed here that the color combination b and the color combination e also match the replacement color combination database (DB-D) 125. In FIG. 6, the color combinations b, e, and g are surrounded by a thick frame indicating that the impression can be shared after replacement.

In a case where the comparing unit 103 compares the reference color combination that does not match the sharable color combination database (DB-E) 123 with the replacement color combination database (DB-D) 125 and, as a result, the reference color combination does not match the replacement color combination database (No in S107), the color combination is determined to have a "low" sharing degree because the impression cannot be shared (S109). This color combination is unusable as a color combination corresponding to the impression word.

Finally, the assigning unit 105 assigns information indicative of a degree of sharing of the impression between a person with C-type color vision and a person with P-type or D-type color vision to each of the reference color combinations on the basis of the aforementioned results, and the reference color combinations assigned a sharing degree is output from the output unit 106 and is then displayed on the display 16 (S110).

Example of Display

FIG. 7 illustrates an example of how the reference color combinations are displayed. As illustrated in FIG. 7, among the reference color combinations, color combinations having a "high" degree of sharing of the impression, i.e., color combinations that can be used as they are given a circle mark, color combinations having a "medium" degree of sharing of the impression, i.e., color combinations that can be used after replacement of an inhibitory color are given a triangle mark, and color combinations having a "low" degree of sharing of the impression, i.e., color combinations that cannot be used are given a cross mark.

Although the circle, triangle, and cross marks are used as information indicative of a degree of sharing of the impression of each of the reference color combinations of FIG. 4, a method for displaying this information is not limited to this, and this information can be displayed by a different method.

As for a color combination having a sharing degree indicated by the triangle mark, i.e., a color combination for which the impression can be shared after replacement, a color combination that replaces the color combination in accordance with the replacement color combination data of FIG. 5 may be displayed. In this case, the color combination conversion unit 104 converts the color combination on the basis of the replacement color combination data, and a color combination obtained by the conversion is displayed on the display 16. This allows the operator to know that not only the color combination can be used after replacement, but also what kind of color combination is actually obtained.

Case Where Color Combination Having "Low" Sharing Degree

Next, a case where an operator wants to use a color combination that has a "low" degree of sharing of an impression, i.e., a color combination that cannot be used as it is and cannot be used even after replacement is described.

FIG. 8 is a flowchart illustrating an example of processing performed in a case where a color combination that has a "low" degree of sharing is used.

For example, a case where the color combination a assigned a cross mark indicative of a "low" sharing degree among the reference color combinations displayed together with sharing degrees illustrated in FIG. 7 is used.

For example, in a case where the color combination a illustrated in FIG. 7 is used as a color combination which an operator wants to use although a sharing degree thereof is "low", the color combination changing unit 107 first converts RGB values of the color combination a into HSV (hue, saturation, and value) values and fixes any of the hue, brightness, and saturation (S200). The following discusses a case where the hue is fixed.

Then, the color combination changing unit 107 changes the brightness and the saturation the color combination at constant intervals and causes color combinations thus obtained to be displayed on the display 16 as illustrated in FIG. 9 (S201). The color combinations may be printed out from a printer instead of being displayed on the display 16 or may be displayed on the display 16 and printed out from a printer.

As illustrated in FIG. 9, the color combination assigned a sharing degree indicated by a cross mark is placed at a center, and color combinations obtained by changing the saturation of the color combination at constant intervals are arranged in a left-right direction, and color combinations obtained by changing the brightness of the color combination at constant intervals are arranged in a top-bottom direction. An amount of change of the saturation and an amount of change of the brightness can be selected from several values as illustrated in the upper left portion of FIG. 9.

Next, a person with P-type or D-type color vision selects a color combination for which an impression can be shared from among the color combinations that are obtained by changing the saturation and brightness and are arranged as illustrated in FIG. 9 (S202). The color combination selecting unit 108 selects the color combination selected by the person with P-type or D-type color vision from among the displayed color combinations.

In the present exemplary embodiment, the original intention is to determine a color combination that corresponds to the impression word "light-hearted" and for which the impression can be shared by a person with C-type color vision and a person with P-type or D-type color vision, and therefore a color combination that causes the person with P-type or D-type color vision to be reminded of the impression "light-hearted" from among all of the color combinations illustrated in FIG. 9 is selected.

In order to prevent a situation where the person with P-type or D-type color vision feels "light-hearted" but the person with C-type color vision does not feel "light-hearted" any more because of too much change of the saturation and brightness, a range 301 in which the person with C-type color vision also feels "light-hearted" is indicated by the large thick frame in FIG. 9. Whether or not a color combination is one that causes the person with C-type color vision to feel "light-hearted" is determined by specifying an impression of which the person with C-type color vision is reminded by the color combination by using a method (called hue-and-tone analysis) described in Japanese Patent No. 3562516. A color combination indicated by a thick frame 302 within the range 301 is the color combination that is placed at the center as a color combination that has a sharing degree indicated by a cross mark.

A color combination that causes even a person with P-type or D-type color vision to feel "light-hearted" within the range 301 indicated by the thick frame in FIG. 9 is newly registered in the hue/brightness/saturation optimum color combination database (DB-E) 126 (S203).

A color combination to be used is specified from color combinations thus registered in the hue/brightness/saturation optimum color combination database (DB-E) 126 (S204). This makes it possible to use a color combination for which an impression can be shared by a person with C-type color vision and a person with P-type or D-type color vision.

Furthermore, the hue/brightness/saturation optimum color combination database (DB-E) 126 thus created can be reused. It is therefore unnecessary for a person with P-type or D-type color vision to select a color combination by changing the saturation and brightness from next time.

Second Exemplary Embodiment

Next, a second exemplary embodiment of the present invention is described below.

In the second exemplary embodiment, an impression word is not input first. Instead, an image of a created object is input. Then, an impression of which a person h C-type color vision is reminded by the image is specified, and a color combination representing the image of the created object is extracted. Next, it is determined, for the color combination, whether or not the specified impression can be shared by a person with C-type color vision and a person with P-type or D-type color vision. In this way, a created object for which the impression can be shared is created.

Configuration of Color Information Display Device According to Second Exemplary Embodiment FIG. 10 is a configuration diagram illustrating an outline of a color formation display device according to the second exemplary embodiment.

As illustrated in FIG. 10, a color information display device 2 according to the present exemplary embodiment includes a controller 20, a memory 22, an input unit 24, a display 26, and the like.

The color information display device 2 according to the present exemplary embodiment has a substantially similar configuration to the color information display device 1 according to the first exemplary embodiment. That is, the controller 20 includes an extracting unit 200, a comparing unit 203, a color combination conversion unit 204, an assigning unit 205, an output unit 206, a color combination changing unit 207, a color combination selecting unit 208, and a database registration unit 209. The extracting unit 200 includes a receiving unit 201 and an acquiring unit 202. The memory 22 includes a color information display program 220, an impression database 221, a color combination database (DB-A) 222, a sharable color combination database (DB-B) 223, an inhibitory color database (DB-C) 224, a replacement color combination database (DB-D) 225, and a hue/brightness/saturation optimum color combination database (DB-E) 226.

The color information display device 2 according to the present exemplary embodiment is different from the color information display device 1 according to the first exemplary embodiment in two points. The first difference is that the color information display device 2 according to the present exemplary embodiment further includes a generating unit 210. The second difference is that the receiving unit 201 of the extracting unit 200 receives not an impression word but image data of a created object, and the acquiring unit 202 specifies an impression of the image data and extracts a color combination representing the image. The other configuration is similar to the color information display device 1 according to the first exemplary embodiment, and detailed description thereof is omitted.

In a case where a color combination extracted from an input image is converted, the generating unit 210 generates an image made up of a color combination obtained by the conversion.

Operation of Second Exemplary Embodiment

FIG. 11 is a flowchart illustrating an example of operation according to the second exemplary embodiment.

First, an image of a created object is input (S300). In this step, image data may be directly input or image data obtained by scanning the image by using a scanner may be input. The receiving unit 201 receives the input image data and then sends the image data to the acquiring unit 202.

The acquiring unit 202 specifies an impression of which a person with C-type color vision is reminded by the image on the basis of a color combination of the image data by using the method (called hue-and-tone analysis) described in Japanese Patent No. 3562516 and extracts a color combination representing the image (S301).

The color combination is extracted by using a k-means method. The extracted color combination may be a color combination of 5 colors or may be a color combination of 3 colors as in the first exemplary embodiment. For simplification of description, the following discusses a case where a color combination of 3 colors is extracted. The extracted color combination is sent to the comparing unit 203.

The comparing unit 203 compares the color combination with the sharable color combination database (DB-B) 223 (S302).

In a case where it is determined, as a result of the comparison, that the color combination matches the sharable color combination database (DB-B) 223 (Yes in S303), the color combination is regarded as a color combination for which the specified impression can be shared between a person with C-type color vision and a person with P-type or D-type color vision and is output from the output unit 206 and is displayed on the display 26 (S304). In this case, the created object having the original color combination can be used.

Meanwhile, in a case where it is determined, as a result of the comparison, that the color combination does not match the sharable color combination database (DB-B) 223 (No in S303), the comparing unit 203 compares the color combination with the inhibitory color database (DB-C) 224 so as to specify an inhibitory color and then compares the color combination with the replacement color combination database (DB-D) 225 (S305).

In a case where an inhibitory color can be specified and where the color combination matches the replacement color combination database (DB-D) 225 (Yes in S306), information indicating that the impression made sharable by replacement of the color combination is output from the output unit 206 and is displayed on the display (S307).

Then, the color combination conversion unit 204 converts the color combination into a replacement color combination, and the generating unit 210 generates image data by using the replacement color combination (S308). The generated image is output from the output unit 206 and is displayed on the display 26 (S309). This allows an operator to use the created object having the replacement color combination after checking how the image of the created object has been converted.

In a case where an inhibitory color cannot be specified or in a case where an inhibitory color can be specified but the color combination does not match the replacement color combination database (DB-D) 225 (No in S306), the operator is asked whether or not to use the color combination because the impression cannot be shared in a case where the color combination is used.

In a case where the operator decides to use the color combination (Yes in S310), RGB values of the color combination are converted into HSV (Hue, Saturation, and Value) values, and any of the hue, saturation, and brightness is fixed. Then, the color combination changing unit 207 changes the other one(s) of the hue, saturation, and brightness of the color combination at constant intervals as in the case illustrated in FIG. 9, and color combinations thus obtained are displayed on the display 26 (S311).

A person with P-type or D-type color vision selects color combinations that give the specified impression to the person with P-type or D-type color vision from among the displayed color combinations and specifies a color combination for which the impression can be also shared by the person with C-type color vision from among the selected color combinations (S312).

The generating unit 210 generates an image simulating the created object by replacing the inhibitory color on a pixel basis by using the specified replacement color combination (S313). The generated simulation image is output from the output unit 206 and is displayed on the display 26 (S314). The operator may use the created object generated by using the replacement color combination after checking the displayed image.

In a case where an inhibitory color cannot be specified or in a case where an inhibitory color can be specified but the color combination does not match the replacement color combination database (DB-D) 225 and where the operator decides not to use the color combination because the impression cannot be shared (No in S310), the processing is finished.

Modification of Second Exemplary Embodiment

A modification of the second exemplary embodiment is described below.

In the present modification, in a case where the specified color combination does not match the replacement color combination database (DB-D) 225 and where the operator tries to use the color combination even though the impression cannot be shared, the following processes are performed instead of the processes in Step S311 and the subsequent steps in FIG. 11.

FIG. 12 is a flowchart illustrating an example of operation of the modification of the second exemplary embodiment.

First, a color combination that can be used for the impression word corresponding to the specified image is specified from the sharable color combination database (DB-B) 223 (S400). This intends to specify and use a color combination that does not match the sharable color combination database (DB-B) 223 but is close to the sharable color combination database (DB-B) 223 although it has been determined in Steps S302 and S303 of FIG. 11 that the color combination does not match the sharable color combination database (DB-B) 223.

Next, the generating unit 210 generates a simulation image by replacing the color combination on a pixel basis by using the specified color combination (S401). Then, the generated image is displayed on the display 26 (S402). The operator may use the created object after checking the color combination of the created object.

The exemplary embodiments of the present invention have been described above, but the present invention is not limited to the exemplary embodiments. The exemplary embodiments may be modified in various ways without departing from the scope of the present invention. For example, in the above exemplary embodiments, the color information display program 120 may be provided by being stored in a recording medium such as a CD-ROM.

Part or all of the units that constitute the controllers 10 and 20 may be a hardware circuit such as a field programmable gate array (FPGA) or an application specific integrated circuit (ASIC).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color information display device comprising:
    a processor programmed to:
        receive an input designating an impression among a plurality of impressions stored in a database;
        extract a reference color combination that makes the designated impression to a person with reference color vision characteristics;
        determine a degree of which the designated impression is shared between the person with the reference color vision characteristics and a person with other color vision characteristics when presented with the extracted reference color combination;
        assign indicative information indicating the determined degree to the extracted reference color combination; and
        based on the assigned indicative information, determine whether to output the extracted reference color combination as it is or after color conversion.

2. The color information display device according to claim 1, wherein the processor is programmed to:
    output the reference color combination as it is in a case where the determined degree indicates that the designated impression is sharable between the person with the reference color vision characteristics and the person with other color vision characteristics when presented with the extracted reference color combination.

3. The color information display device according to claim 2, wherein the processor is programmed to:
    extract the reference color combination by:
        accepting a word expressing an impression, and
        acquiring a color combination corresponding to the word as the reference color combination.

4. The color information display device according to claim 3, wherein the processor is programmed to:
    acquire a plurality of color combinations corresponding to the word.

5. The color information display device according to claim 2, wherein the processor is programmed to:
    extract the reference color combination by:
        receiving an image, and
        acquiring a color combination of colors that constitute the image as the reference color combination.

6. The color information display device according to claim 5, wherein the processor is programmed to:
    in a case where the acquired color combination is output after conversion, generate an image constituted by a color combination obtained by the conversion.

7. The color information display device according to claim 5, wherein the processor is programmed to:
    generate an image constituted by a color combination that corresponds to a word corresponding to the acquired color combination and that gives an impression sharable between different color vision characteristics in a case where the impression of the acquired color combination is not sharable between the different color vision characteristics.

8. The color information display device according to claim 1, wherein the plurality of impressions stored in the database includes at least one of light-hearted, lively, energetic, and radiant.

9. The color information display device according to claim 1, comprising one or more storage devices storing:
   (i) the database storing the plurality of impressions;
   (ii) a database of color combinations corresponding to each of the plurality of impressions as perceived by the person with the reference color vision characteristics; and
   (iii) a database of inhibitory colors that make an impression that is not shared between the person with the reference color vision characteristics and the person with other color vision characteristics.

* * * * *